United States Statutory Invention Registration [19]

[11] Reg. Number: H588

Latham, II [43] Published: Feb. 7, 1989

[54] TRANSVERSAL FILTER USED AS AN EQUALIZER FOR DATA READOUT FROM A DISK DRIVE

[75] Inventor: Paul W. Latham, II, Newmarket, N.H.

[73] Assignee: Data General Corporation, Westborough, Mass.

[21] Appl. No.: 108,512

[22] Filed: Oct. 13, 1987

[51] Int. Cl.[4] ..... G11B 5/02

[52] U.S. Cl. ..... 360/65

*Primary Examiner*—Deborah L. Kyle
*Assistant Examiner*—Michael J. Carone
*Attorney, Agent, or Firm*—Gerald Cechony

[57] ABSTRACT

A disk drive employs transversal filters as equalizers for each of its read heads, permitting adaptive equalization of read head signals, optimized for each track position.

5 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TRANSVERSAL FILTER USED AS AN EQUALIZER FOR DATA READOUT FROM A DISK DRIVE

BACKGROUND OF THE INVENTION

1. Field of the Invention

This invention reIates to magnetic data storage devices, and particularly to equalization of data signals read back from magnetic data storage devices.

2. Description of the Prior Art

References:

Aaron, M. R. and Tufts, D. W., "Intersymbol Interference and Error Probability." IEEE Trans. Inform. Theory, IT-12 (1), 26–34 1966 (hereinafter, "Aaron"). Kallmann, H. E., "Transversal Filters." Proc. IRE, 28, 302–310, July 1940 (hereinafter, "Kallman"). Lucky, R. W., "Automatic Equalization for Digital Communications." Bell Systems Tech. J., 45(2), 255–286 1966 (hereinafter, "Lucky"). Proakis, J. G., Digital Communications. New York: McGraw-Hill Book Company, 1983 (hereinafter, "Proakis").

The readback signal from magnetic recording heads, such as those used in disk drives, has a characteristic response having the form of a pulse for every magnetization reversal (transition) on the recording media. Information in a disc drive is typically stored as the time spacing between pulses or magnetic transitions. The minimum time spacing between transitions is determined by the "width" (the extent to which a pulse can interfere with its neighbors) of the readback pulse. If the spacing is too small, adjacent pulse interference distorts the time spacing. This can cause errors in the information read back. Thus, the pulse width limits the information density and capacity of the disc drive.

If the width of the readback pulse can be minimized, the information density can be increased. Unfortunately, minimizing the pulse width increases the noise. This noise increase can also increase the chances of making an error. For a given probability of error and information density, there is an optimum trade-off between errors from noise and errors from pulse interaction (see Aaron). This optimum trade-off can be viewed as a particular pulse response or width. A filter that transforms the given readback signal into a signal that has the desired trade-off is normally called an equalizer.

In disc drives, the magnetic transitions are stored in concentric circles known as "tracks". The recording head is mechanically moved to the desired track and information can be stored and retrieved. To simplify the electronics, the information content of each track is kept constant over the whole media surface or part of the surface (constant zones). Because the Circumference of the tracks varies, and the timing is constant, the width of the pulses changes from one track to another. In addition, the recording head typically flies on an air cushion (hard discs) to minimize wear. The air cushion thickness varies with tangential veIocity, which is a function of track location. This results in an additional variation of pulse width with track location. This pulse width variation preclides the use of a constant or fixed value fiIter (equalizer) for optimizing the pulse width for all tracks.

SUMMARY OF THE INVENTION

The present invention overcomes these drawbacks of the prior art by connecting a transversal filter, well known in the communications arts, in the readback path from the read head. Since a transversal filter may be programmable, its output can be optimized individually for each track.

It is thus a general object of the present invention to provide improved readback signals from magnetic data recording devices.

It is a particular object of the present invention to provide readback signals inmmagnetic data recording devices in which pulse width and noise characteristics are optimizable.

Other objects and advantages of the present invention will by understood by those of ordinary skill in the art, after referring to the detailed description of the preferred embodiment and the appended drawings wherein:

IN THE DRAWINGS

FIG. 1 is a block diagram of an LC delay line and an integrated circuit configured to form a transversal filter in a data readback path.

DETAILED DESCRIPTION

Figure 1:
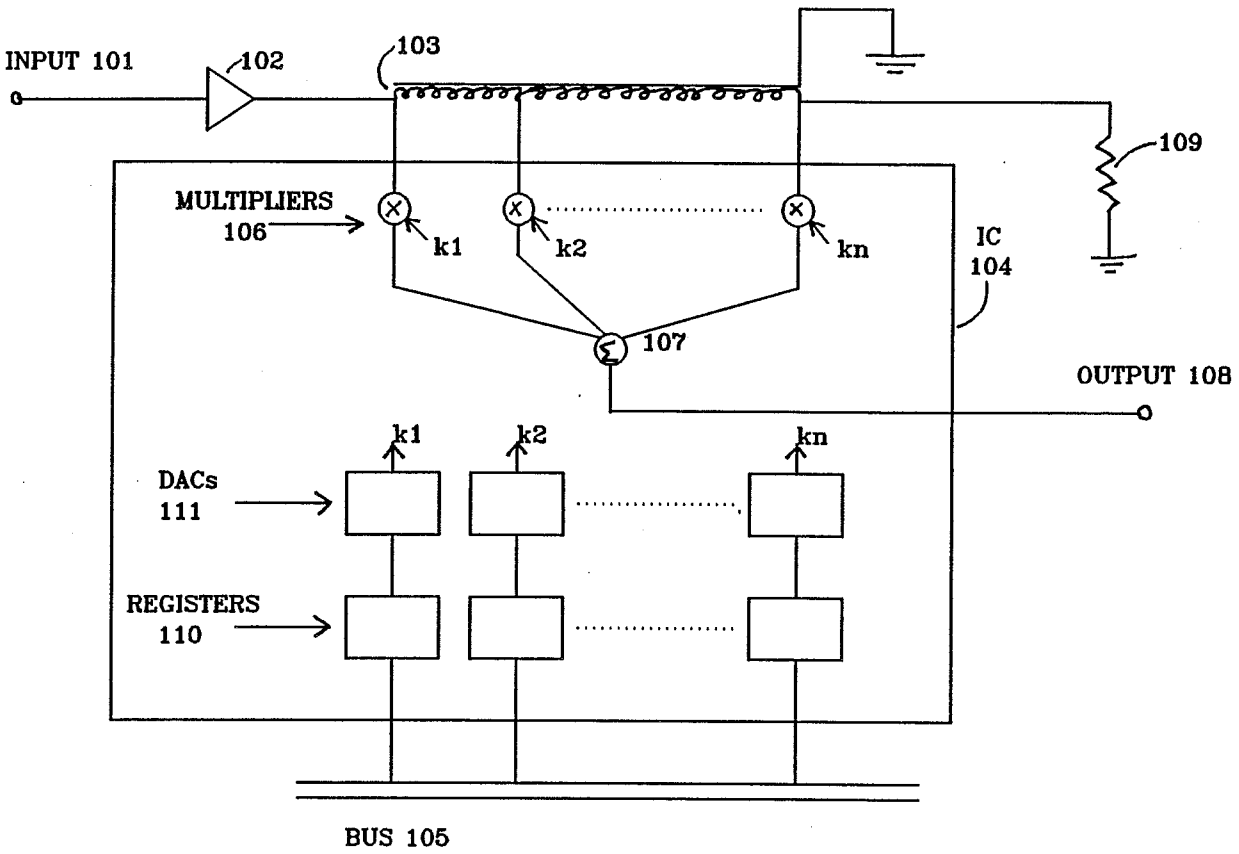

Transversal filters (see Kallman) are the analog equivalent of finite impulse response filters. Transversal filters work by a simple algorithm—the transversal fiIter's output is the weighted linear combination of its input delayed by different amounts of time. A typical implementation utilizes an L-C delay line to delay the input signal. The delayed signals are multiplied by constant values ("tap weights") and summed. This is shown by the equation:

$$y(t) = \sum_{i=1}^{n} C_i * x(t - T_i)$$

where:

y(t) is the output at time t.

$C_i$ is the $i_{th}$ tap weight.

x(t) is the input at time t.

$T_i$ *is the ith* delay.

n is the number of taps.

There are several advantages in the use of transversal filters. Transversal filters can have non-minimum phase responses. This results in the ability to control magnitude and phase responses independently, a property that is required for the correct minimization of pulse width. Transversal filters have an out put that is linear in the tap weights. This property makes their design the simple solution of simultaneous linear equations. Also, the output is non-recursive (depends on inputs only) and always stable. This makes it easy to implement adaptive control (see Lucky). A final advantage is their ease in digital control. The multiply and sum functions can be integrated using IC technology to make implementation of the transversal filter and control of the tap weights cos effective.

The equalization of readback signals in disc drives can be done by transversal filters. By using enough taps any desired accuracy can be obtained. Computer control of the taps can be used to vary the equalization to compensate for track-to-track readback signal variations, such as by providing a different set of tap weights for each track. Thus, the optimum pulse width can be achieved for each track. Without this flexibility, a fixed filter must be designed as a compromise for an average track. The fixed filter then results in a lower density and/or worse error rate. Variations in head, disc, and eleotronio components can be compensated for by measuring the components at the time of manufacture and adjusting the taps accordingly. These variations and time dependent variations from temperature and/or aging can be compensated by adaptive adjustment of the taps by an automatic control system such as a computer or special hardware (see Proakis).

FIG. 1 depicts such an embodiment of a transversal filter. Input 101, from the disc drive read head, is input (through amplifier 102) to LC delay line 103, which is terminated to ground through resistor 109. LC delay line 103 is provided with "n" taps of varying amounts of delay (including zero delay at the input and full delay at the output), each of which is input to a multiplier 106 in integrated circuit 104.

In the present embodiment, resistor 109 has a value equal to the characterisic impedance of the delay line. In an a' ·rnative embodiment, resistor 109 may be given a value ·  ·r than the characteristic impedance, causing reflections ·nd thus effectively multiplying the length of the delay line. Most commonly, the end of the delay line may be shorted to ground (giving resistor 109 an effective value of zero) or may be left unterminated (giving resistor 109 an effective value of infinity).

Each multiplier 106 is also provided with a contant by whioh it multiplies its input signal. The constants are provided over computer bus 105 from a digital computer (not shown); the constants are provided as binary numbers, are buffered in registers 110 and converted to analog values by DAC's (digital-to-analog converters) 111. The outputs of the "n" multipliers 106 are all input to summer 107 which adds them to produce output 108. In the present embodiment, registers 110, DACs 111, multipliers 106, and summer 107 are all contained within an integrated circuit 104.

In an alternative embodiment, only "n-1" multipliers are provided; one of the taps is thus constrained to always having unity tap weight. In this embodiment, the pulse width and phase can be regulated by adjusting the gains of the other taps, but the gain of the filter cannot be regulated; however, gain adjustment may be performed elsewhere in the circuit, such as in amplifier 102.

The invention may be embodied in yet other specific forms without departing from the spirit or essential characteristics thereof. Thus, the present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a data storage device for storing data on a magnetic medium and having read heads for retrieving the data from the magnetic medium, an equalizer operatively connected to each read head comprising a transversal filter for equalizing the data from the read head.

2. The equalizer recited in claim 1, wherein the transversal filter comprises a delay line having a first end and a second end, the first end being operatively connected to the read head, the delay line having a plurality of taps for delaying the signal from the read head by varying amounts; a plurality of multipliers, one connected to each of the taps for multiplying the plurality of delayed read head signals each by a weight; and a summer connected to each of the plurality if multipliers for adding the plurality of delayed multiplied read head signals to produce the equalized output.

3. The equalizer recited in claim 2, further comprising means for dynamically imputting the weights from a digital computer.

4. The equalizer recited in claim 2, wherein a certain one of the weights always has a value of one, and further comprising means for dynamically inputting the weights other than the certain one from a digital computer.

5. The equalizer recited in claim 2 further comprising reflecting means connected to the second end of the delay line.

* * * * *